Figure 1:
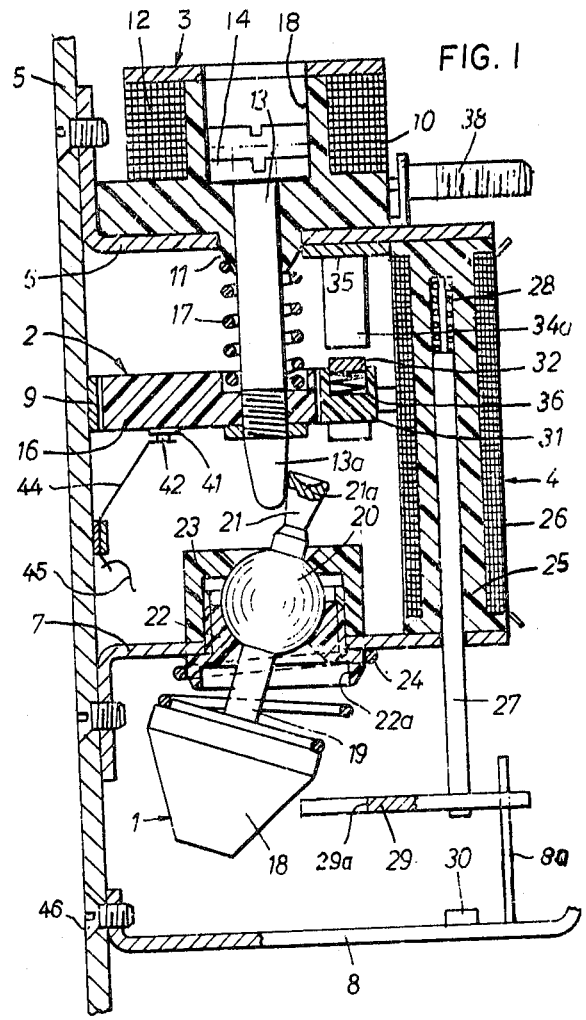

United States Patent [19]

Rossel et al.

[11] 4,308,438
[45] Dec. 29, 1981

[54] SAFETY CUT-OUT FOR MOTOR VEHICLES

[75] Inventors: Roland Rossel; Marc Mathez, both of Tramelan, Switzerland

[73] Assignee: R.T.R. S.A., Berne, Switzerland

[21] Appl. No.: 106,852

[22] Filed: Dec. 26, 1979

[30] Foreign Application Priority Data

Jan. 10, 1979 [CH] Switzerland ............................ 225/79

[51] Int. Cl.³ ............................................ H01H 35/14
[52] U.S. Cl. .................................. 200/61.5; 180/279;
307/121; 340/52 H
[58] Field of Search ................. 200/61.45 R, 61.45 M,
200/61.48, 61.49, 61.5, 61.51, 61.52, 61.53;
180/279, 4-6 D; 340/52 H; 307/121

[56] References Cited

U.S. PATENT DOCUMENTS 2,331,017 10/1943 Ericson .............................. 200/61.5
3,110,780 11/1963 Schultz et al. ..................... 200/61.5
3,745,277 10/1973 Shawcross et al. ................ 200/61.5

FOREIGN PATENT DOCUMENTS 2038639 1/1971 France .
538187 6/1973 Switzerland .

Primary Examiner—J. V. Truhe
Assistant Examiner—Morris Ginsburg
Attorney, Agent, or Firm—Stevens, Davis, Miller & Mosher

[57] ABSTRACT

A rocker having a ball-and-socket mounting, hence movable in any direction, is normally held in a fixed position by the conical tip of a catch assembly which is pressed by a spring against the head of the rocker. In the event of a concussion, the rocker pivots, an armature forming part of the catch assembly is pulled toward the rocker, and a contact holder is simultaneously displaced, the path of movement of the contact holder being shorter than that of the armature. A contact element is thereupon separated from the matching contact stud, breaking the battery-grounding circuit. Provision may be made for an auxiliary circuit to be closed at the same time by a bridge connecting two additional contacts. By means of two electromagnets, the cut-out can also be actuated and reset by remote control.

8 Claims, 5 Drawing Figures

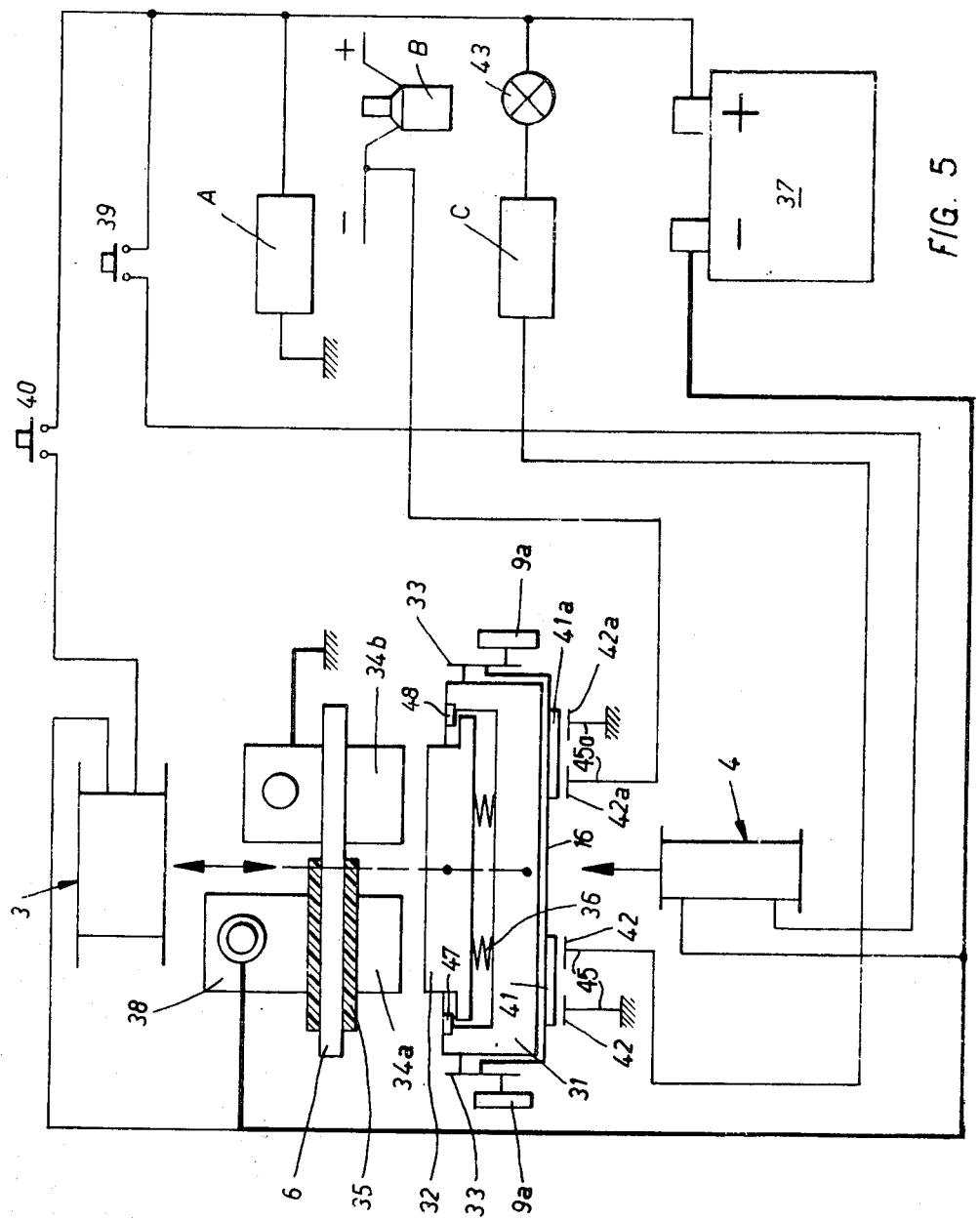

SAFETY CUT-OUT FOR MOTOR VEHICLES

This invention relates to a safety cut-out for motor vehicles, of the type comprising a rocker mounted on a ball-and-socket joint, catch means movable between a closed-circuit position and an open-circuit position, a spring for keeping the catch means pressed against the rocker to lock the latter when the cut-out is in the closed-circuit position and for moving the catch means to the open-circuit position when the rocker is dislodged from its locked position, e.g., as the result of a concussion, and a switch comprising at least one fixed contact element and one movable contact element, the latter mounted on a contact holder which moves with the catch means.

The use of safety cut-outs in motor vehicles, and particularly in racing cars, is becoming increasingly widespread, and the usefulness of such devices has been amply demonstrated. However, practical experience with the prior art devices has revealed certain shortcomings and inadequacies of such apparatus.

Swiss Pat. No. 538,187 describes a cut-out in which the catch means is an angled part pivoting about a fixed axis with respect to the frame of the device. Experience has shown the apparatus to be too bulky, so that it has not met with complete success.

U.S. Pat. Nos. 3,745,277 and 2,331,017 and French Pat. No. 2,038,639 disclose safety cut-outs comprising a ball-and-socket rocker. These devices are more compact than that of the aforementioned Swiss patent. Nevertheless, it has become apparent that it would be desirable to add to the cut-outs of the type initially mentioned certain supplementary functions which would considerably increase their usefulness. Thus, one of the elements which it seemed desirable to provide was a simple and practical means by which the cut-out could be returned to its closed-circuit position after the circuit had been broken. In most of the prior art devices, the cut-out is reset manually by pressing a lever-associated button or by pulling a handle. The study of possible improvements based upon the previous designs has indicated, however, that the addition of electromagnetic-type resetting means encounters difficulty because the distance travelled by the catch means is relatively short, so that resetting by means of an electromagnetic coil requires a considerable amount of force to recompress the spring, and, consequently, such a large electromagnet that the size of the cutout exceeds the desirable dimensions.

Moreover, the studies carried out also show that it would be desirable to be able to equip the cut-out with one or even several auxiliary switches which close when the circuit is broken.

Thus, it is an object of this invention to provide an improved safety cut-out for motor vehicles, of the type initially mentioned, to which supplementary functions can be added with a view to increasing its possibilities of use and, consequently, its utility in motor vehicles, while at the same time keeping it as compact as possible.

To this end, in the safety cut-out according to the present invention, the improvement comprises a linkage connecting the contact holder to the catch means, whereby the contact holder is caused to move over a shorter distance than the catch means when the circuit is broken, and an armature element connected to the catch means and adapted to cooperate with an electromagnet coil connected into a resetting circuit.

Figure 2:
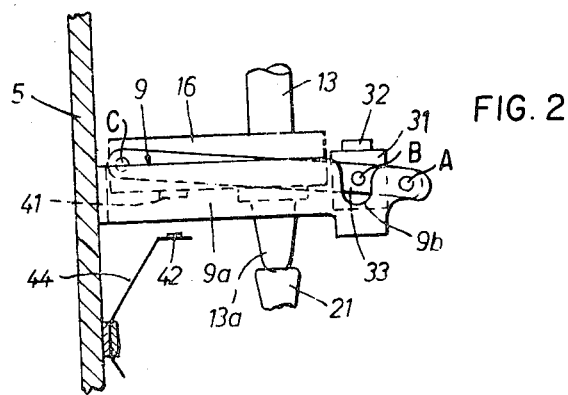
Figure 3:
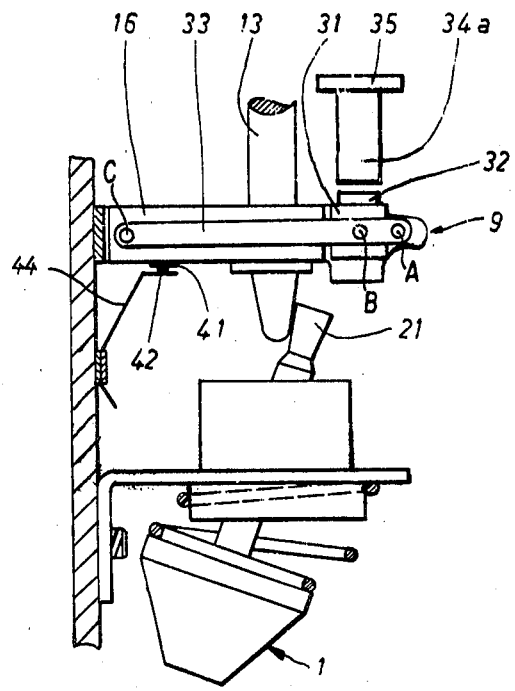
Figure 4:
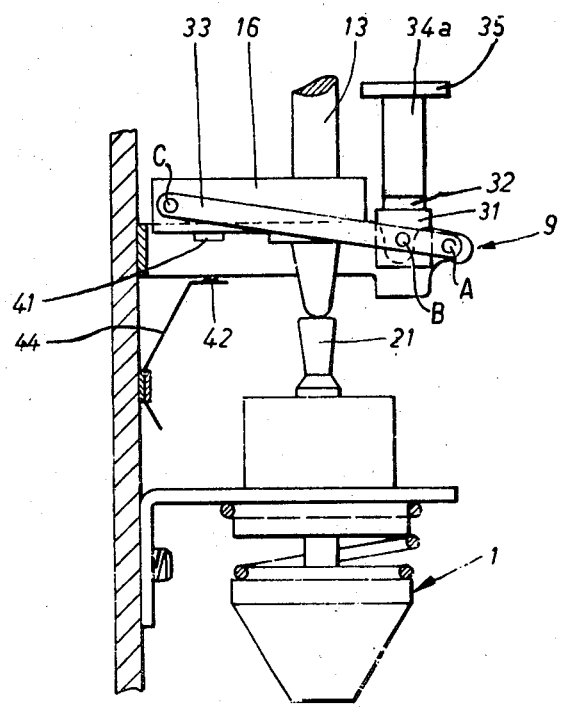

A preferred embodiment of the invention will now be described in detail with reference to the accompanying drawings, in which:

FIG. 1 is a simplified longitudinal section through the cut-out with the cover partially broken away, FIG. 2 is a partial side elevation of an element of the cut-out shown in FIG. 1, FIGS. 3 and 4 are partial side elevations showing the rocker, the catch means, and the contact holder in unlocked and locked positions, respectively, and FIG. 5 is an electrical diagram of the cut-out and of its connections to the battery and the electric circuit of an automobile.

FIG. 1 shows the main elements of the cut-out in unlocked position. A rocker 1, a catch assembly 2, a resetting electromagnet 3, and a circuit-breaking electromagnet 4 are mounted on a common frame comprising a base plate 5, angled support plates 6 and 7, a cover 8, and a bracket 9 to be described in more detail below. Plates 6 and 7 are screwed to base plate 5. Cover 8 is also screwed to base plate 5 by screws 46. The main axis of the device is parallel to the plane of plate 5, and the unit is intended to be secured vertically in an automobile in such a way that in case of lateral impact, the inertia of rocker 1 causes it to leave its locked position (FIG. 2) and to assume the unlocked position shown in FIG. 1.

Support plate 6 bears a generally cylindrical coil form 10 of plastic material having a conical hub 11 inserted in a hole in plate 6. Coil form 10 holds the winding 12 of resetting electromagnet 3 and, by means of a cylindrical center bore, guides a rod 13 of catch assembly 2. Rod 13 starts from a head 14 acting as the movable armature of electromagnet 3. In the position shown in FIG. 1, head 14 is situated at the bottom of an entry recess 15 in coil form 10. The other end of rod 13 takes the form of a rounded, conical tip 13a, and the cylindrical portion of rod 13 passes through a square plastic contact-holder plate 16 to which rod 13 is screwed so that plate 16 is integral with rod 13 and constitutes therewith the catch assembly 2 of the cutout. In order to improve the operation of this armature, it might also be made slightly conical in shape, the minimum diameter being at the level of head 14, which would likewise be frustoconical in the other direction. As may be seen in FIG. 1, a slightly conical spring 17 encircles hub 11 and enters a recess in plate 16 so as to push the movable element of electromagnet 3 downward, as viewed in FIG. 1. When coil 12 of resetting electromagnet 3 is excited by the closing of a contact, as will be seen below, movable armature 14 is urged upward and executes a movement of translation, guided by coil form 10, against the bias of spring 17.

It is conical tip 13a which serves as the locking element for rocker 1. The latter is made up of a generally conical inertia block 18, a stem 19, the ball 20 of a ball-and-socket joint, and a locking head 21. These elements are aligned along an axis, and ball 20 is held within two spherical sockets, one made in a seat 22 and the other in a screw-cap 23. These two plastic elements 22 and 23 are mounted on lateral support plate 7 which extends parallel to and somewhat below plate 16. By tightening screw-cap 23, ball 20 can be gripped to a greater or lesser extent between the two elements 23 and 22 so that rocker 1 can be adjusted to rotate about its center in all directions while being held without play. At the bottom of seat 22 is a collar 22a for guiding a spring 24 which connects seat 22 to inertia block 18 and presses at its lower end against a shoulder of block 18. Spring 24 constantly urges rocker 1 into a position coaxial with movable armature 14. It is strong enough to lift inertia block 18 even when the cut-out is in a generally oblique position. Thus, spring 24 ensures that the cut-out can be reset in whatever position the automobile may be. Head 21 of rocker 1 is slightly frustoconical in shape, and its top surface is provided with a hollow 21a which matches the tip of conical end 13a and makes possible the locking of rocker 1, as will be seen below.

Electromagnet 4, also shown in FIG. 1, makes possible the remote actuation of the cut-out at will. A coil form 25, also of plastic material, is secured at both ends to lateral bosses of support plates 6 and 7. It carries a winding 26 and includes a central cylindrical blind bore accommodating a movable rod 27 which acts as the armature and is biased away from the bottom of the blind bore by a spiral spring 28. Secured to the lower end of rod 27 is a laterally extending plate 29 of plastic material which acts as a deviator member. This plate is guided by a guiding rod 8a provided on cover 8 which passes through deviator plate 29, the guide rod extending parallel to base plate 5. As long as coil 26 of electromagnet 4 is not live, spring 28 acts upon rod 27 and pushes it downward, so that deviator member 29, guided by guide rod 8a as provided on the cover 8 of the device, rests against a stop 30 fixed to the sidewall of cover 8.

When deviator member 29 is in this position, rocker 1 can assume its locked position, which may be seen in FIG. 4. Deviator member 29 is a plate having a notch 29a in its left edge as seen on FIG. 1. The notch 29a engages the side portion of block 18 when coil 26 is excited. When coil 26 is excited, rod 27 is attracted to the interior of coil form 25, and as deviator member 29 rises, it comes up against inertia block 18. Since block 18 is conical, it is forced away laterally by deviator member 29, and this force is sufficient to cause unlocking of rocker 1, so that rod 13 and catch assembly 2 move downward under the effect of spring 17. At the same time, conical tip 13a slides down alongside rocker head 21, thus preventing rocker 1 from returning to its locked position.

Those elements which bring about the opening and closing of the main switch of the cut-out will now be described with reference to FIGS. 2, 3 and 4. Square plastic plate 16, fixed to rod 13, is shown in FIG. 2. It will be seen that rod 13 is not fixed in the center of plate 16 but slightly to one side and that an elongated part of parallelepiped shape, designated by reference numeral 31, extends alongside plate 16, parallel thereto. This part constitutes a contact holder and supports a contact element 32 in the form of a bridge which constitutes the essential element of the cut-out. The manner in which contact element 32 is mounted on contact holder 31 will be described further on. Contact holder 31 is connected to plate 16 by two rigid metal bars 33 functioning as levers. Bars 33 are disposed laterally with respect to plates 16 and 31 and are hinged at C to plate 16 near the edge thereof facing base plate 5, on the one hand, and to the ends of part 31 at B, on the other hand. The ends of bars 33 extending beyond part 31 are each hinged at A to one of the arms 9a of bracket 9. The base of bracket 9 is fixed to base plate 5, and arms 9a embrace the movable parts described above. Near the right-hand end of each arm 9a, as viewed in FIG. 2, there is a notch 9b to allow movement of the head of the articulated joint coupling between lever 33 and part 31. In FIGS. 3 and 4, the ends of arms 9a of bracket 9 are shown in dot-dash lines. Here, too, levers 33 are shown hinged to plate 16, on the one hand, and to part 31, on the other hand, and the end of rod 13 is shown fixed to plate 16.

A comparison of FIGS. 3 and 4 shows the relative positions of elements 16, 31, and 32 when rocker 1 is in its unlocked position, as in FIG. 3, or in its locked position, as in FIG. 4. It will be seen that the distance travelled by the catch assembly (13, 16) is much greater than that travelled by part 31. Contact element 32 rests against two contact studs 34a and 34b (FIG. 5) in the position shown in FIG. 4, whereas it is spaced from these studs in FIG. 3. Between these two positions, part 31 is moved by means of its pivot connection to bars 33. Moreover, it is guided by the edge of plate 16. As soon as element 32 contacts fixed elements 34a and 34b, its face rests against them. The final phase of the movement effected by plate 16 then causes springs 36 (FIGS. 1 and 5) to be compressed, so that contact element 32 presses firmly against studs 34a and 34b. Only stud 34a is visible in FIGS. 3 and 4; it is fixed, with interposition of an insulating strip 35, to a part of support plate 6 which extends laterally beyond electromagnet 3.

Returning to FIG. 1, it may be seen how contact element 32 is mounted on contact holder 31. This latter part, made of plastic material, has a rectangular recess facing plate 6 and studs 34a and 34b. Contact element 32 is accommodated in this recess and biased by one or more springs 36 which are compressed between the bottom of the recess and the underside of element 32. The latter is held in place by retaining members 47, 48 shown schematically in FIG. 5. Contact element 32 acts as a bridge and, in the closed-circuit position of the cutout, i.e., when rocker 1 is in its locked position, electrically connects studs 34a and 34b.

From the foregoing explanations, it follows that the distance travelled by movable rod 13 when rocker 1 changes from its locked position (FIG. 4) to its unlocked position (FIG. 3), e.g., as a result of concussion, is much greater than that travelled by contact holder 31 and, consequently, by contact element 32. Conversely, the amount of energy which has to be supplied by electromagnet 3 when the device changes from the position of FIG. 3 to that of FIG. 4, at the time of resetting, must be sufficient to compress spring or springs 36 and spring 17. Now, the amount of energy supplied by electromagnet 3 is equal to the force acting upon movable armature 14 multiplied by the length of the path travelled by that armature. Coil 12 can be made all the smaller because this energy is supplied over a long path. The energy necessary to press contact holder 31 against studs 34a and 34b is easily supplied by coil 12. It is essential that the contact between element 32 and studs 34a and 34b be faultless inasmuch as all the current necessary for the electric system of the vehicle passes through these contacts during normal operation. Thus, it is possible to reset the cut-out by means of an electromagnet coil of compact size. The arrangement of levers 33 hinged to plate 16, on the one hand, and to contact holder 31, on the other hand also makes possible a considerable reduction in the overall size of the cut-out, so that the device as a whole, including electromagnet 4 for remote-control cut-out, will fit in a housing measuring no more than 15 cm. long and 6 cm. square.

FIG. 5 is a general electrical diagram of the cut-out. The vehicle battery is designated by symbol 37. The main battery grounding circuit is shown in heavy lines. It goes from the negative pole of the battery to a terminal 38 borne by a bent tongue electrically connected to stud 34a. From there, the circuit passes through contact element 32, when it is in the closed-circuit position, then through stud 34b. The latter is connected to the ground of the vehicle by support plate 6 and base plate 5. Circuit A symbolizes the entirety of the elements which require electric power in the vehicle. It is connected between ground and the positive pole of the battery. Furthermore, the various auxiliary circuits are shown, particularly a circuit which powers the coil of the remote circuit-breaking electromagnet 4. This circuit passes through a push button switch 39 which may, for example, be mounted on the dashboard of the automobile and which makes it possible to actuate the cut-out. Another auxiliary circuit passes through the coil of electromagnet 3 and through a push button switch 40 which may likewise be mounted on the dashboard.

However, the cut-out as described may include still other auxiliary circuits which may be briefly described by reverting to FIGS. 1, 3, and 4. As is apparent from these figures, plate 16, which is integral with movable armature rod 13, carries two contact bridges 41 and 41a on the underside thereof. These bridges face contact elements 42 and 42a which are secured to the ends of resilient tongues 44 mounted on base plate 5. Tongues 44 respectively electrically connect with wires 45, 45a (FIG. 5) which respectively lead to two electrical circuits and ground. When rocker 1 is in its unlocked position, e.g., immediately after a concussion, when the main circuit of the vehicle has been broken, bridges 41 and 41a are in contact with elements 42 and 42a, so that the auxiliary contacts are closed and current passes through wire paths 45 and 45a, as shown in FIG. 5. They are connected to terminals placed on cover 8 of the device, thus facilitating connection at the time of installation. They are open, on the other hand, when the situation is normal, i.e., when rocker 1 is locked by the catch assembly consisting of the movable portion 2 of electromagnet 3. Contact elements 41, 41a, 42, and 42a are likewise shown in FIG. 5. It will be seen that plate 16 carries the two adjacent bridges 41 and 41a and that, when the cutout is open, a first of these bridges closes a switch across wires 45 powering an auxiliary circuit designated as C. Furthermore, switch 42a, 41a, which is also closed, grounds through wires 45a the secondary of the ignition coil B.

As is well known, the more highly developed the devices in the electrical system of automobiles become, the greater interest there may be in providing certain emergency or safety functions in case of accident. Thus, auxiliary circuit C shown in FIG. 5 may, for example, cause the seat belts to unfasten with a certain time-lag if the cut-out has been actuated following a collision. It might also automatically switch on an emergency beacon or the car's breakdown blinkers.

It will be advantageous to provide a signal lamp 43 indicating that the cut-out device has been actuated.

Thus, owing to the fact that the catch assembly of the device described above includes a large-size plate 16 movable in translation with the rod 13 guided in the bore of the coil form, it has been possible to incorporate in the cut-out the bridges 41 by which auxiliary switches are controlled. On the other hand, however, the reduction in size achieved by means of the linkage described, connecting contact holder 31 to the catch assembly (13, 16), and the presence of electromagnets 3 and 4 for remote resetting and automatic actuation, also makes it possible to increase the number of functions of the safety cut-out. This apparatus becomes an instrument having not only a safety function but also a function aiding in the maintenance and servicing of the vehicle; for in a particular embodiment, push button switch 40 might, for example, be provided with a lock and placed in a hidden location on the car. This would make it possible to combine the device described with an anti-theft function. All that would be necessary, after shutting off the engine and taking out the ignition key, would be to unlock the rocker by pressing push button 39. In this case, it would be necessary to operate switch 40 before starting the car, and this could be done only by the car owner having the proper key. The engine would obviously not start until the cut-out had been reset by operating button 40, thus exciting electromagnet 3 and causing movable armature assembly 2 to assume a position such that rocker 1 returns to its normal place and main contacts 32, 34a, 34b are closed.

It has also been found that installation of this device facilitates maintenance work, for it is very easy to disconnect the whole electrical system of the car without having to dismantle the cable connections of the battery, an operation which is not always very convenient and is liable to cause damage.

The possibility of disconnecting the electric circuit of the vehicle also contributes toward protection and care of the battery, above all in cold weather, by preventing current leakage, thus prolonging the life of the battery.

What is claimed is:

1. A safety cut-out for motor vehicles comprising a rocker with a ball-and-socket mounting, catch means movable between a closed-circuit position and an open-circuit position, a spring acting upon said catch means in said closed-circuit position for keeping said catch means pressed against said rocker and for moving said catch means into said open circuit position if said rocker is dislodged from said catch means, a switch including at least one fixed contact element and at least one movable contact element, a contact holder supporting said at least one movable contact element and adapted for simultaneous movement with said catch means, linkage means for connecting said contact holder to said catch means for causing said contact holder to move over a shorter path than said catch means during said simultaneous movement, a resetting means for repositioning a dislodged said catch means and rocker such that said catch means is again pressed against said rocker, said resetting means including an electromagnet coil, and an armature element associated with said catch means and adapted to cooperate with said electromagnet coil to reposition a dislodged said catch means and rocker.

2. The safety cut-out of claim 1, further comprising a frame and a part integral with said frame and including a continuous passageway, wherein said catch means form a rigid displaceable unit including a conical tip, a plate, a rod coaxial with said tip, and a head disposed at the end of said rod remote from said tip and having a larger diameter than said rod, said tip pressing upon said rocker when said catch means are in said closed-circuit position, said rod being guided within said passageway, and said head constituting said armature element.

3. The safety cut-out of claim 2, further comprising a plurality of pairs of further contact elements, one element of each of said pairs being borne by said plate and the other element of each of said pairs being resiliently mounted on said frame, each of said pairs constituting an auxiliary switch adapted to be closed when said catch means are in said open-circuit position.

4. The safety cut-out of claim 2, wherein said contact holder is situated laterally adjacent to and parallel to one side of said plate and is pivotingly mounted on elements of said linkage means.

5. The safety cut-out of claim 4, wherein said linkage means comprises two parallel bars, each hinged near one end thereof to said plate and near the other end thereof to said frame.

6. The safety cut-out of claim 5, wherein said contact holder is pivotingly mounted between said parallel bars, the orientation of said contact holder about the pivot axis being determined by said plate.

7. The safety cut-out of claim 1, wherein said contact holder comprises a recess accommodating said movable contact element, and resilient pressure elements holding said movable contact element in place, said switch comprising two adjacent fixed contact elements, and said movable contact element pressing against said fixed contact elements when said catch means are in said closed-circuit position.

8. The safety cut-out of claim 1, further comprising a controllable circuit-breaking electromagnet including a displaceable armature and a fixed excitation coil, and a rocker-dislodging member borne by said displaceable armature and adapted to dislodge said rocker from said catch means upon excitation of said circuit-breaking electromagnet.

* * * * *